United States Patent Office 3,449,238
Patented June 10, 1969

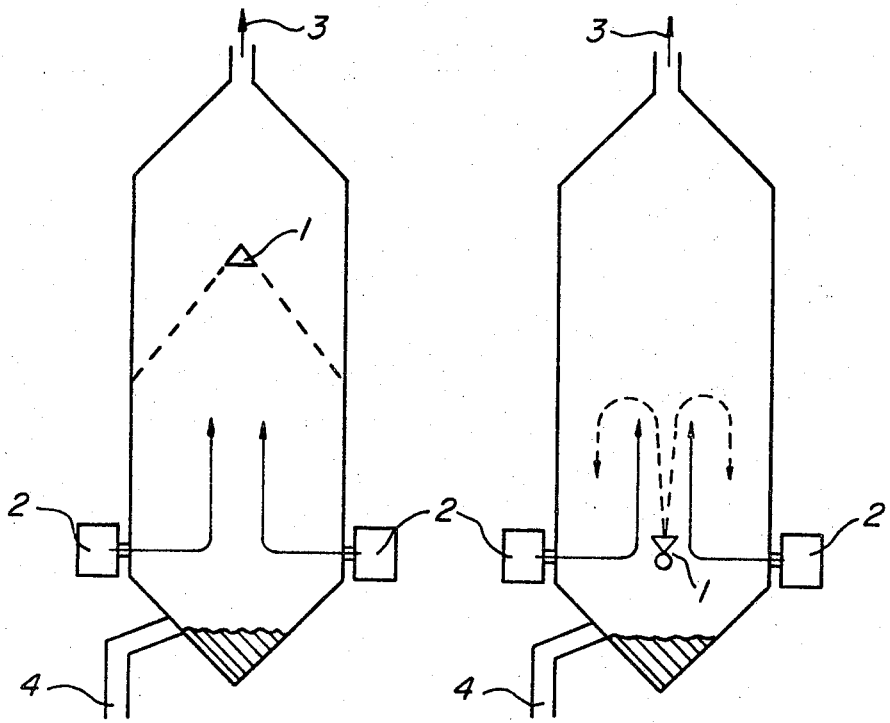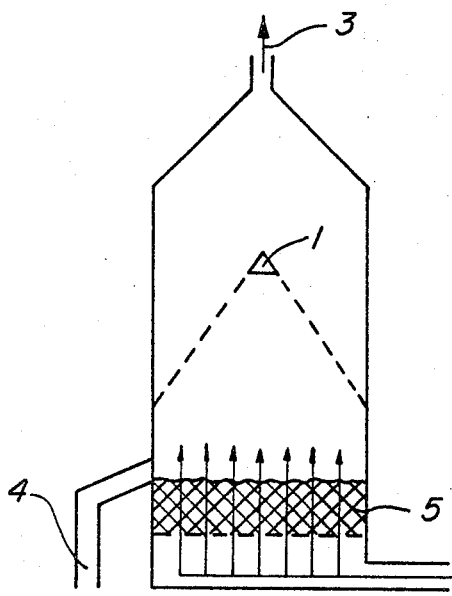

3,449,238
PROCESSING HYDROCARBONS CONTAINING CARBON BLACK
Dieter Stockburger and Richard Sinn, Ludwigshafen (Rhine), Ludwig Raichle, Limburgerhof, Pfalz, Karl Buschmann, Neustadt, and Wolf-Dieter Stege, Mannheim, Germany, assignors to Badische Anilin- & Soda-Fabrik Aktiengesellschaft, Ludwigshafen (Rhine), Germany
Filed Aug. 26, 1966, Ser. No. 575,294
Claims priority, application Germany, Sept. 1, 1965, B 83,533
Int. Cl. C10g 17/04; B01d 1/16
U.S. Cl. 208—186                10 Claims

ABSTRACT OF THE DISCLOSURE

A method of separating carbon black from a mixture of carbon black and a high-boiling hydrocarbon oil, as obtained when cooling or quenching hot gases containing finely-divided carbon black by means of said hydrocarbon oil, wherein the mixture in the form of a suspension of said carbon black in the hydrocarbon oil is atomized and the atomized droplets are contacted with a hot gas stream during free fall of said droplets to vaporize and separate hydrocarbon oil therefrom while forming the carbon black into solid globular particles of approximately the same size as said droplets, the solid particles being recovered as a carbon black product.

---

The present invention relates to a method of processing hydrocarbons containing carbon black. It relates particularly to the recovery of hydrocarbons from a mixture containing hydrocarbons and a large amount of carbon black.

It is an object of the invention to separate carbon black from hydrocarbons containing the same. Another object of the invention is to recover hydrocarbons from mixtures of carbon black and hydrocarbons. A further object is to produce carbon black in the form of solid spherical particles.

It is known that the cracked gas obtained in the cracking of gaseous or liquid hydrocarbons for the production of gaseous olefins, acetylene or synthesis gas at high temperatures may be quenched and at the same time washed with a high boiling point oil. Carbon black present in the gas and part of the heat of the gas are absorbed by the oil. The hot oil is usually recycled for steam recovery through a heat exchanger and used again after cooling for washing cracked gas. The carbon black absorbed from the cracked gas builds up in the oil. When the content of carbon black reaches a certain value which becomes evident from a viscous consistency of the oil and at which the oil can no longer be pumped, a portion of the oil containing carbon black has to be replaced by oil which contains less carbon black or none at all. The oil used for quenching the hot gas is usually a mixture of high boiling aromatic hydrocarbons having a boiling point range of 100° to 350° C., for example naphthalene, which does not undergo change in its chemical constitution in contact with the hot gas. Since these oils are however more expensive than ordinary fuel oils, they cannot be used as fuel oils. Attempts have therefore been made to separate the carbon black and the other solid constituents from the wash oil by filtering or centrifuging. It has been found, however, that only the coarse particle fraction can be separated and the amount thereof is insignificant, so that an oil-containing carbon black sludge remains which cannot be utilized.

It is also known that oils containing carbon black can be regenerated in a mechanically moved indirectly heated bed of granular petroleum coke. The temperature of the petroleum coke should be at least as high as the upper limit of the boiling point range of the hydrocarbons. These are vaporized, while the carbon black is withdrawn from the moving bed in the form of dry globular petroleum coke. It has been found however that this method is not trouble-free in operation.

It is also known that hydrogen oils containing carbon black may be processed with simultaneous recovery of oil coke by reacting the hydrocarbon oil containing carbon black in a fluidized bed of oil coke with oxygen or an oxygen-containing gas, in the presence or absence of steam. Valuable oil coke is lost however in this method.

We have now found that in a method of processing hydrocarbons containing carbon black, particularly those obtained by cooling hot gases containing carbon black, by evaporation of the hydrocarbon and separation of the carbon black followed by recovery of the hydrocarbon, using liquid hydrocarbons, good results are obtained by atomizing the hydrocarbon containing carbon black, if desired after a binding substance has been added, and bringing it into contact wtih a stream of hot gas.

Examples of hydrocarbons containing carbon black are high boiling point mixtures of hydrocarbons containing carbon black which boil in a range of from 140° to 350° C., for example propylbenzene, xylenes and mixtures thereof, naphthalene or chloronaphthalene.

The carbon black content may vary within wide limits. It may be for example 1 to 50% (by weight) of carbon black.

Hydrocarbons containing carbon black are formed for example by quenching hot gases containing carbon black which have been formed in the production of acetylene and/or ethylene from hydrocarbons, for example methane or light naphtha, by heating for example in an electric arc, by mixing with hot flue gases or by partial combustion with oxygen.

By the atomization, the hydrocarbon containing carbon black is broken up into droplets having a diameter of about 0.1 to 4 mm. The hot gas should not in general produce any chemical change in the carbon black or in the hydrocarbon or its vapor. The stream of gas should therefore be substantially free from oxygen, i.e., the content of oxygen should not exceed 5% (by volume).

Other elements or compounds, for example halogens or halohydrocarbons, should not be present in the gas stream. Examples of suitable gases are superheated steam, superheated hydrocarbon vapor, nitrogen, flue gas from stoichiometric combustion, or cracked gas or parts thereof.

During evaporation of the hydrocarbon there are formed from the carbon black contained therein solid globular particles which are about the same size as the original droplets. The time taken for the formation of the particles is only a few seconds. The temperature at which the gas stream enters the spray tower has as its upper limit the maximum permissible temperature for the heating of the hydrocarbon to be regenerated and for the wall material, and the lower limit is determined by the requirements that the spray tower should not be unduly large and that the consumption of energy should be at a minimum. It is advantageous for the inlet temperature of the gas always to be above the boiling temperature of the hydrocarbon or the upper limit of the boiling range of the hydrocarbon mixture. About 800° C. may be regarded as the upper limit for this temperature. The direction of flow of the gas stream and the mixture of hydrocarbon and carbon black into the atomizing tower may be cocurrent or countercurrent or any combination of the two. It is advantageously chosen so that the almost dried coke comes into contact with the hot gas current in order that it may vaporize higher boiling constituents of the hydrocarbon mixture. The coke granules formed (for which there are excellent commercial applications) are removed from the container through an air lock while the evaporated hydrocarbon is separated from the gas stream in special scrubbing plant and reused.

To increase the strength of the coke particles formed, small amounts of binders (for example resins, asphalts or bitumens) may be added to the mixture being regenerated. The content of these substances in the hydrocarbon containing carbon black may be from about 0.1 to 5% (by weight).

The container in which the hot gas is brought into contact with the atomized mixture of hydrocarbon and carbon black may conveniently be a spray drying such as is shown diagrammatically in FIGURE 1 of the accompanying drawings. The stream of hot gas may be introduced toward the bottom at 2 and the mixture containing carbon black may be injected toward the top at 1 so that the two media move counter-current. The gas stream laden with hydrocarbon leaves at 3. The coke is withdrawn at 4. Conventional atomizing equipment may be used, centrifugal-disk atomizers and pressure nozzles being particularly suitable.

In a modification of this method, the fountain principle may be adopted as illustrated in FIGURE 2 of the drawing. Here the stream of gas 2 is again passed upwardly. The mixture of hydrocarbon and carbon black is however supplied to the bottom of the tower and sprayed upward in the direction of the axis of the tower by a pressure nozzle 1. Gravitation causes the particles, after they have traveled a certain distance, to reverse direction and to fall to the bottom. The gas stream laden with hydrocarbon is withdrawn at 3, while the coke is removed at 4. The advantage of this method resides in the smaller dimensions of the spray tower.

Another possibility (illustrated in FIGURE 3) is to only predry the droplets of the mixture of hydrocarbon and carbon black during free fall through the spray tower so that they form solid particles and to complete drying in a fluidized bed 5, advantageously located in the lower portion of the tower. In this case the mixture of hydrocarbon and carbon black is introduced near the top at 1 and the gas stream is introduced at the bottom 2 and flows through the fluidized bed 5. The gas stream is withdrawn at 3. The particles of coke are removed from the fluidized bed at 4. Here again the dimensions of the spray tower may be smaller. The particles size of the petroleum coke (obtained in globular shape) may be varied by choice of the atomizing device and the atomizing conditions. Particle diameters of less than 4 mm. are possible. Those of from 0.1 to 1 mm. have proved to be particularly satisfactory. Particularly uniform petroleum coke is obtained by using hollow-cone pressure nozzles.

The gas stream may be heated directly or indirectly. The gas velocity in the spray tower is chosen so that the bulk of the petroleum coke is deposited in the tower itself and can be withdrawn at the bottom. The coke may then be cooled for example in a fluidized bed cooler operated with cold gas free from oxygen, to such an extent that it can be transported without difficulty.

In the process according to this invention the hydrocarbons used are recovered almost without loss and unchanged chemically. It is therefore possible to use for the quenching and washing of the cracked gas containing carbon black a high grade aromatic hydrocarbon, for example naphthalene.

Various methods may be used for separating the hydrocarbon vapor from the gas stream, for example cooling or condensation, or adsorption of the hydrocarbon vapor, for example onto active carbon or in solvents.

A direct cooler having a hydrocarbon of the same type in liquid phase as the cooling medium may be used for the cooling. If the hydrocarbon solidifies at room temperature or at a temperature at which losses in the offgas are too high, the hydrocarbon in the first washing stage is cooled only to a temperature above its melting point and in the second stage the first hydrocarbon is washed out from the offgas with a second hydrocarbon which has good solvent power for the first hydrocarbon and which remains liquid at room temperature. Room temperature means the ambient temperature prevailing at the place where the process is being carried out. The two hydrocarbons should then be separated from each other in a rectifying column. The coolant in the second washing stage (in the above-mentioned case when the first hydrocarbon is cooled below its melting point) may be water. A suspension of the solid hydrocarbon in water is then formed. The hydrocarbon may then be extracted from the suspension by means of a second hydrocarbon which has good solvent power for the first and which is immiscible with water and is liquid at room temperature, the mixture of the two hydrocarbons being separated from the water, for example in a settling tank.

When flue gas which has been prepared by combustion of fuel gas or fuel oil with air in stoichiometric ratio, is used as the hot gas stream, this should be cooled to the desired inlet temperature into the spray tower. Either a part of the offgas may be mixed with the hot gas stream or cooled coke particles, for example the fines from the petroleum coke which has been separated in a cyclone after the spray tower, may be brought into contact with the hot gas stream. In the last mentioned method the consumption of energy, expenditure for gas washing and the dimensions of the spray tower are all decreased.

It is also possible to recyle the drying gas. The gas leaving the spray tower is then cooled in a direct cooler and the hydrocarbon condensed out therefrom. The same hydrocarbon is advantageously used as the coolant. The gas leaving the cooler still contains hydrocarbon vapor according to the saturation vapor pressure at the outlet temperature. This gas is heated up again in a heat exchanger to the inlet temperature into the spray tower. If carbon deposits occur in the heat exchanger, these may be burnt off from time to time.

The invention is illustrated by the following example.

EXAMPLE

A mixture of naphthalene and carbon black containing 25% (by weight) or carbon black is regenerated at the rate of 8 metric tons per hour. The drying gas is nitrogen which is recycled. The plant for regenerating the mixture consists substantially of a tower having atomizing means, a direct cooler in the form of a column and a heat exchanger for heating up the recycle gas and has the following data:

(a) Spray tower:
Diameter, 8 meters;
Height of cylinder, 10 meters;
Total height, 20 meters;
Atomizing means, pressure nozzle;
Atomizing pressure, 6 atmospheres gauge.

(b) Direct cooler:
Diameter, 2 meters;
Height 16 meters;
Baffles, ten Glitsch plates, thirty plates for washing.

(c) Heat exchanger:

Heating by flue gas;
Heating area, 80 square meters.
The spray dryer operated countercurrent.

The petroleum coke withdrawn from the tower has a temperature of 500° C. and the following approximate particle size distribution:

|  | Percent |
|---|---|
| More than 400 microns | 0.5 |
| 300 to 400 microns | 7 |
| 200 to 300 microns | 33 |
| 100 to 200 microns | 50 |
| Less than 100 microns | 9.5 |

It contains less than 4% of constituents having a boiling point lower than 800° C. and has high solidity. The temperature at which the drying gas enters the tower is 600° C. and the temperature at which it leaves is 300° C. The gas from the tower is cooled countercurrent with naphthalene in the direct cooler. The amount of naphthalene recycled is 150 cu. m./h. The naphthalene enters the cooler and the drying gas leaves the cooler at a temperature of 100° C. Downstream of the direct cooler the drying gas contains 1.36 kg. of naphthalene per cu. m. Naphthalene containing carbon black may be processed for about two weeks without trouble.

We claim:

1. In a method of purifying high-boiling hydrocarbon oils contaminated with finely divided carbon black as obtained by using the hydrocarbon oil as a quenching liquid for cooling hot gases containing said carbon black, by evaporating, separating and recovering said hydrocarbon oil, the improvement comprising atomizing the mixture of said hydrocarbon oil containing said carbon black and contacting the atomized droplets with a hot gas stream during free fall of the droplets to vaporize and separate said hydrocarbon oil therefrom while recovering the residual carbon black product as solid globular particles.

2. A method as claimed in claim 1 wherein a binder is added to said contaminated hydrocarbon oil prior to its atomization for recovery of globular particles of said carbon black strengthened by said binder.

3. A method as claimed in claim 2 wherein said binder is added to said contaminated hydrocarbon oil in an amount of about 0.1 to 5% by weight.

4. A method as claimed in claim 1 wherein said high-boiling hydrocarbon oil consists essentially of naphthalene.

5. A method as claimed in claim 1 wherein said atomized droplets have a diameter of about 0.1 to 4 mm. and the globular particles of carbon black have approximately the same diameter.

6. A method as claimed in claim 1 wherein said stream of hot gas is prepared by combustion of fuel gas or fuel oil and is cooled to the temperature required for said vaporization of hydrocarbon oil from said atomized droplets by first bringing it into contact with cooled carbon black particles which originate from said contaminated hydrocarbon oil.

7. A method as claimed in claim 1 wherein the atomized droplets of hydrocarbon oil containing carbon black are only predried during free fall in said hot gas stream to form solid globular particles of carbon black and drying of said globular particles is completed in a fluidized bed.

8. A method as claimed in claim 7 wherein said globular particles of carbon black in said fluidized bed have a diameter of about 0.1 to 1 mm.

9. A method as claimed in claim 1 wherein said hydrocarbon oil is a normally solid substance at room temperature, the effluent hot gas stream containing said hydrocarbon oil in vaporized form is cooled in a first washing stage by contact with a correspondingly normally solid hydrocarbon oil maintained in the liquid phase to initially cool said vaporized hydrocarbon oil only to a temperature above its melting point, and said vaporized hydrocarbon oil in the offgas from said first stage is washed out in a second stage with a different hydrocarbon which is normally liquid at room temperature and which has a good solvent power for the initially vaporized hydrocarbon oil.

10. A method as claimed in claim 1 wherein said hydrocarbon oil is a normally solid substance at room temperature, the effluent hot gas stream containing said hydrocarbon oil in vaporized form is cooled in a first washing stage by contact with a correspondingly normally solid hydrocarbon oil maintained in the liquid phase to initially cool said vaporized hydrocarbon oil only to a temperature above its melting point, and said vaporized hydrocarbon oil in the offgas from said first stage is washed out in a second stage with water at a temperature sufficient to solidify the extracted hydrocarbon oil, the resulting solid hydrocarbon suspended in said water then being extracted therefrom by means of a different hydrocarbon which is normally liquid at room temperature, which is not miscible with said water and which has a good solvent power for the solid hydrocarbon, and the resulting mixture of hydrocarbons then being separated from the water.

References Cited

UNITED STATES PATENTS 3,074,856  1/1963  Meliss _____ 208—28

FOREIGN PATENTS 1,368,443  6/1964  France.
1,420,739  11/1965  France.

HERBERT LEVINE, *Primary Examiner.*

U.S. Cl. X.R.

23—209.9, 314; 208—180